United States Patent
Goettke et al.

(10) Patent No.: US 12,535,114 B2
(45) Date of Patent: Jan. 27, 2026

(54) PLASTIC SPRING

(71) Applicant: RPC Bramlage GmbH, Lohne (DE)

(72) Inventors: Sabine Goettke, Lohne (DE); Martin Presche, Dinklage (DE)

(73) Assignee: RPC Bramlage GmbH, Lohne (DE)

( * ) Notice: Subject to any disclaimer, the term of this patent is extended or adjusted under 35 U.S.C. 154(b) by 727 days.

(21) Appl. No.: 17/426,559

(22) PCT Filed: Jan. 24, 2020

(86) PCT No.: PCT/EP2020/051698
§ 371 (c)(1),
(2) Date: Jul. 28, 2021

(87) PCT Pub. No.: WO2020/156933
PCT Pub. Date: Aug. 6, 2020

(65) Prior Publication Data
US 2022/0106996 A1   Apr. 7, 2022

(30) Foreign Application Priority Data

Jan. 29, 2019 (DE) .................. 10 2019 102 186.3
Nov. 28, 2019 (DE) .................. 10 2019 132 345.2

(51) Int. Cl.
*F16F 1/373* (2006.01)
*F16F 1/377* (2006.01)

(52) U.S. Cl.
CPC .......... *F16F 1/3732* (2013.01); *F16F 1/377* (2013.01)

(58) Field of Classification Search
CPC ............................. F16F 1/3732; F16F 1/377
See application file for complete search history.

(56) References Cited

U.S. PATENT DOCUMENTS

| | | | |
|---|---|---|---|
| 4,901,987 A | 2/1990 | Greenhill et al. | |
| 5,622,358 A | 4/1997 | Komura et al. | |
| 6,068,250 A | 5/2000 | Hawkins et al. | |
| 6,237,901 B1 * | 5/2001 | Bianchi ................. | B60G 11/48 267/286 |
| 9,826,797 B2 | 11/2017 | Elder et al. | |

(Continued)

FOREIGN PATENT DOCUMENTS

| | | |
|---|---|---|
| DE | 102005063497 B4 | 9/2009 |
| EP | 1 351 893 A1 | 10/2003 |

(Continued)

OTHER PUBLICATIONS

International Search Report for PCT/EP2020/051698 mailed Jun. 15, 2020 (with English translation).

*Primary Examiner* — Melody M Burch
(74) *Attorney, Agent, or Firm* — Collard & Roe, P.C.

(57) ABSTRACT

A plastic spring includes a lower spring ring and an upper spring ring, which are arranged essentially coaxially to one another, wherein a plane, which is in each case spanned by the spring rings, extends essentially perpendicular to a longitudinal axis of the plastic spring, and wherein, in addition, the spring rings are connected to one another compressibly by spring legs, which extend over more than 90 degrees in the circumferential direction, wherein the spring legs run into the lower and/or upper spring ring in a transition portion, wherein a spring leg further has a central longitudinal axis, which follows the curved progression of the spring leg.

14 Claims, 12 Drawing Sheets

(56) References Cited

U.S. PATENT DOCUMENTS

| | | | |
|---|---|---|---|
| 2007/0021718 A1 | 1/2007 | Burren et al. | |
| 2009/0102106 A1* | 4/2009 | Ohashi | F16F 1/3665 |
| | | | 267/153 |
| 2011/0169205 A1 | 7/2011 | Kempf et al. | |
| 2016/0097434 A1* | 4/2016 | Russell | F16F 1/328 |
| | | | 267/162 |

FOREIGN PATENT DOCUMENTS

| | | | | |
|---|---|---|---|---|
| FR | 2845052 A1 * | 4/2004 | | B60R 1/0617 |
| FR | 2969241 A1 | 6/2012 | | |
| JP | S62155345 A * | 7/1987 | | |
| JP | 2007285423 A | 11/2007 | | |
| WO | 2009094793 A1 | 8/2009 | | |
| WO | 2018126397 A1 | 7/2018 | | |

* cited by examiner

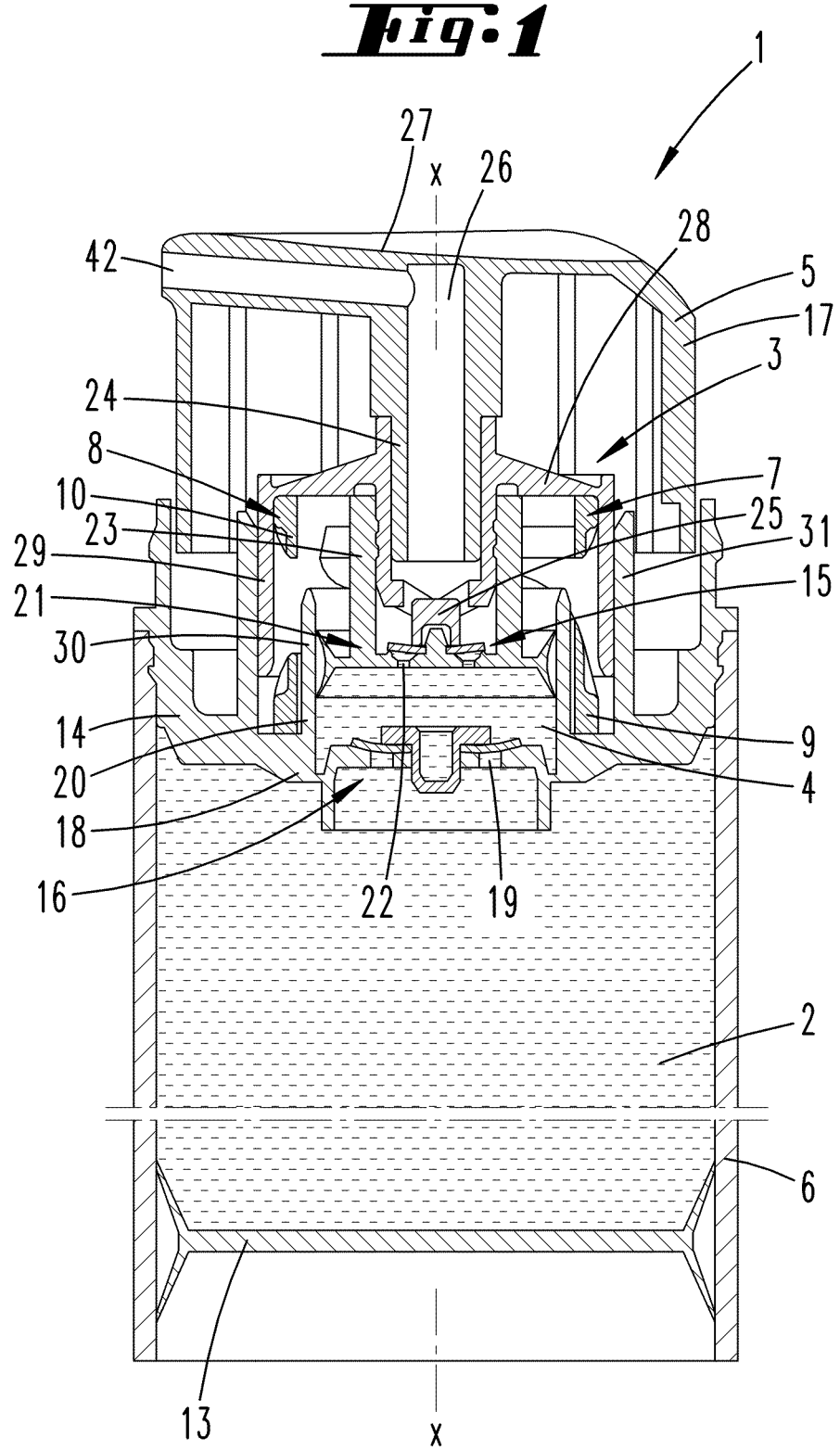

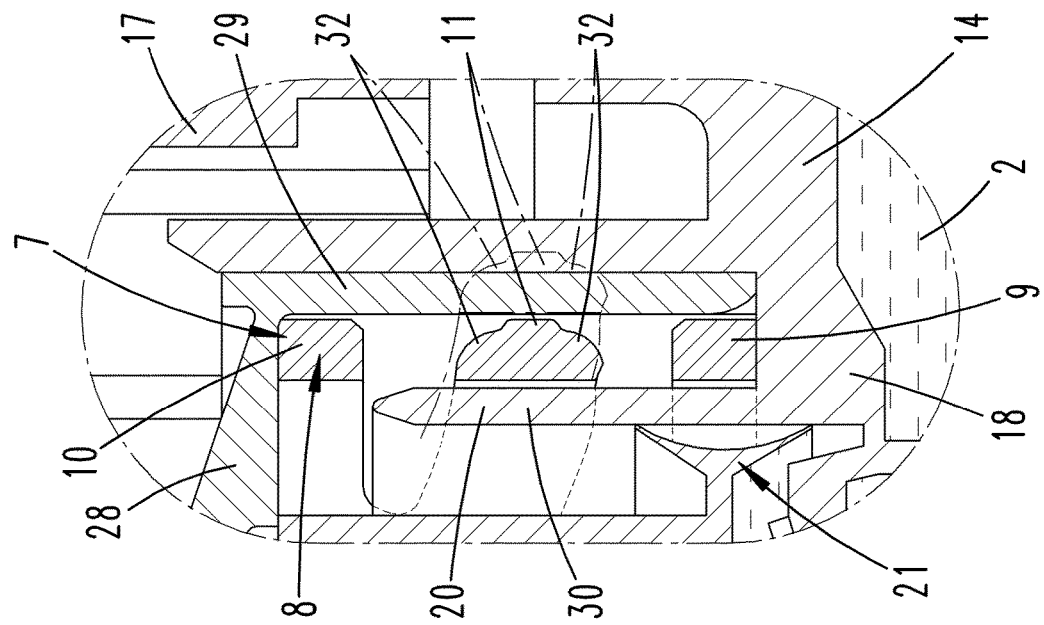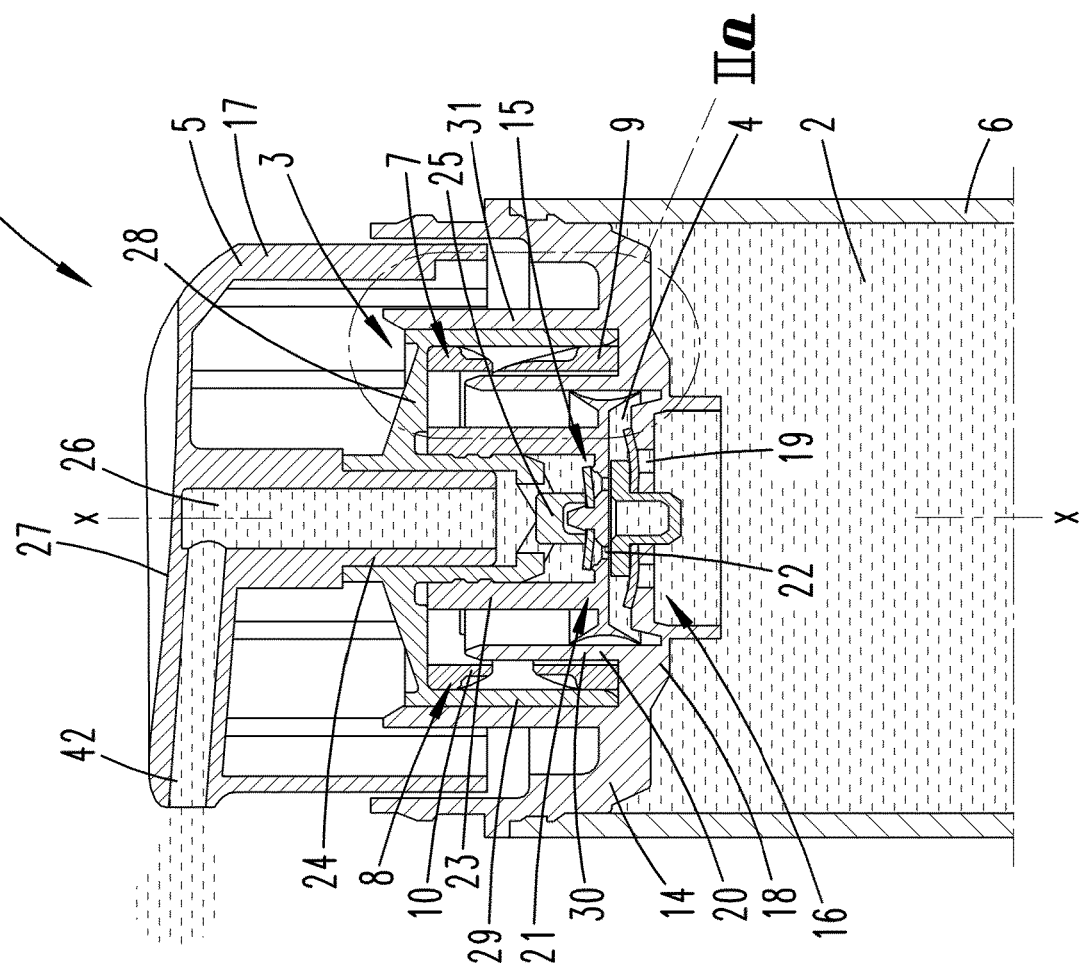

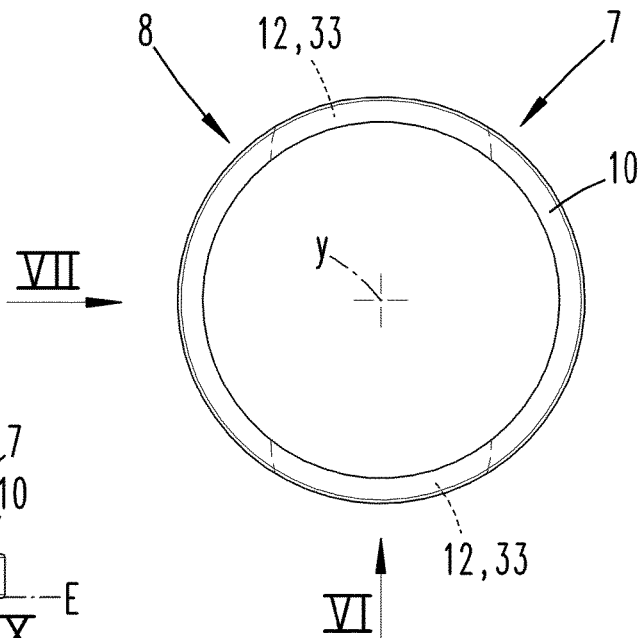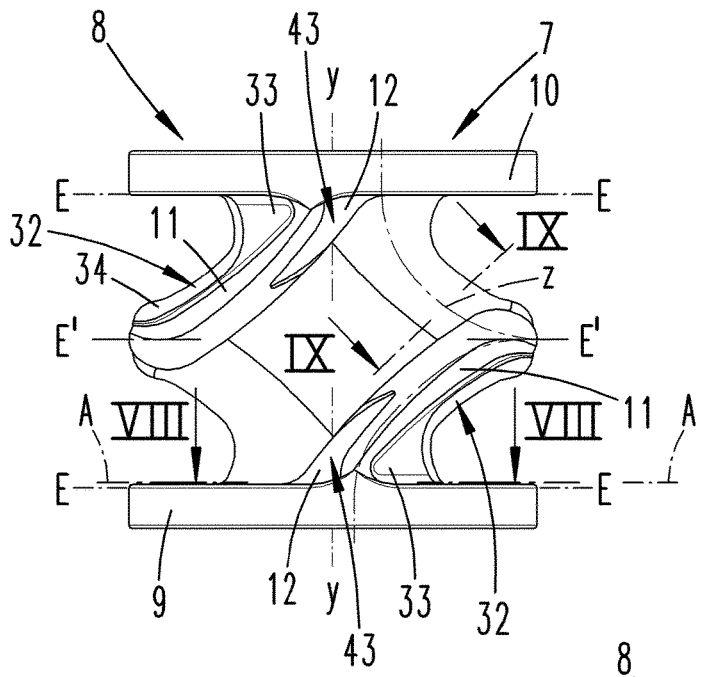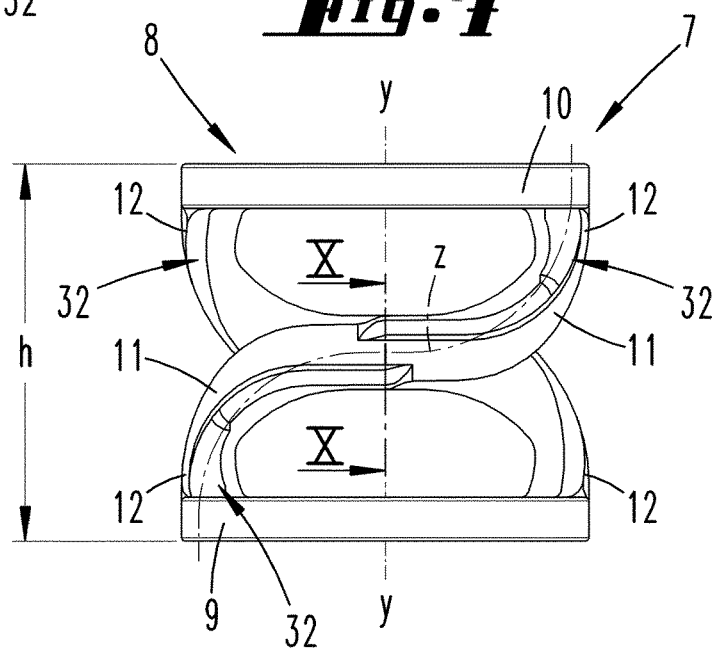

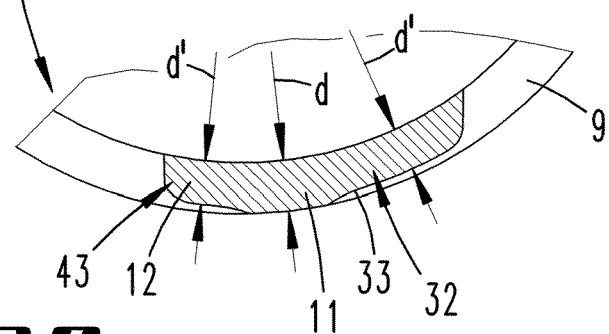
Fig. 8
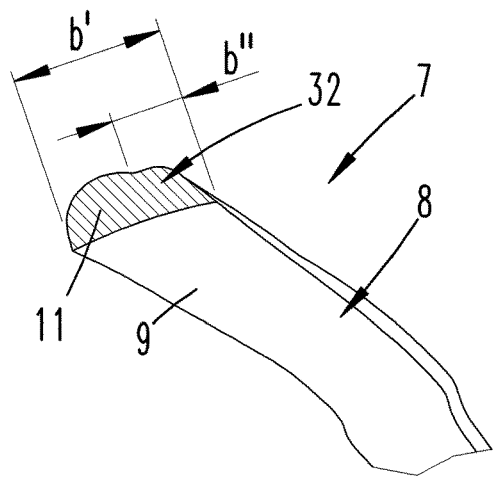
Fig. 9
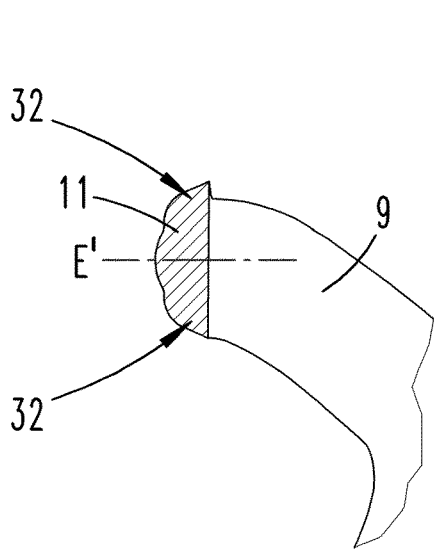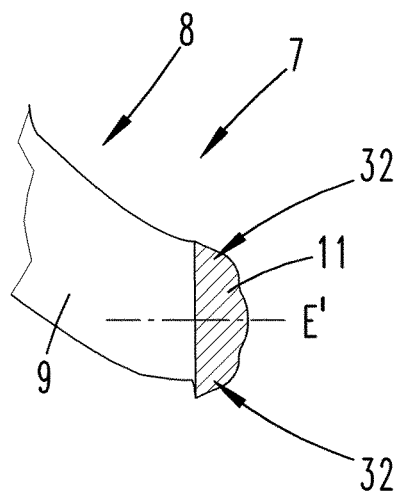
Fig. 10

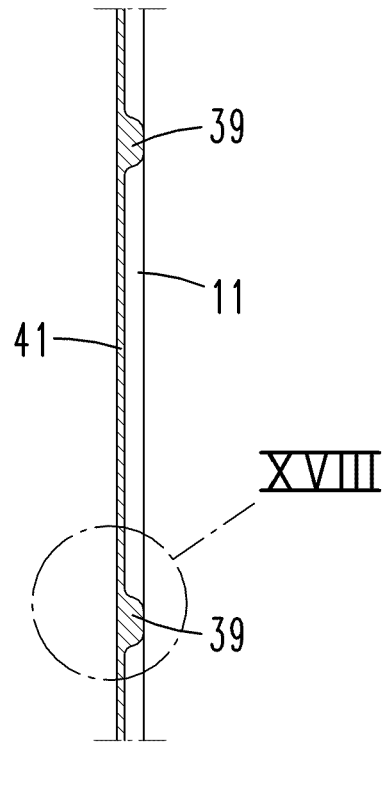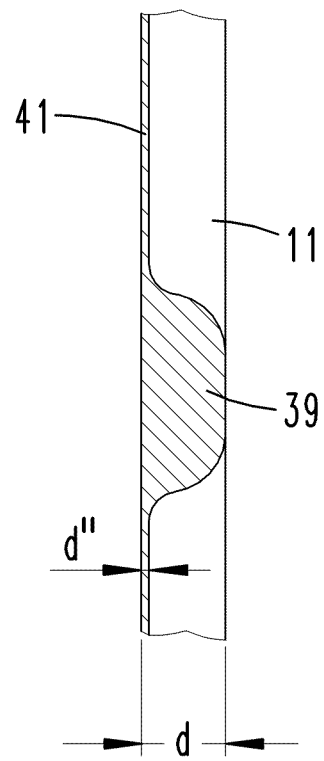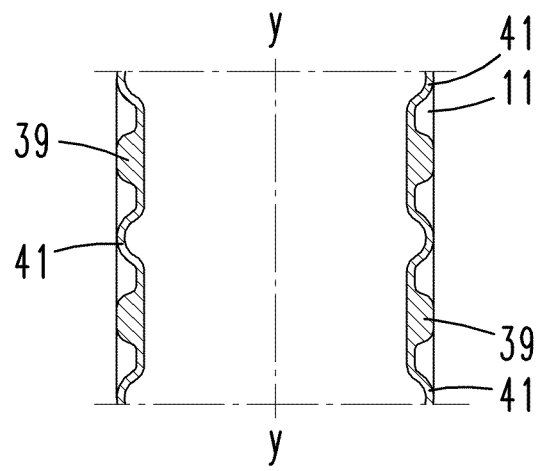

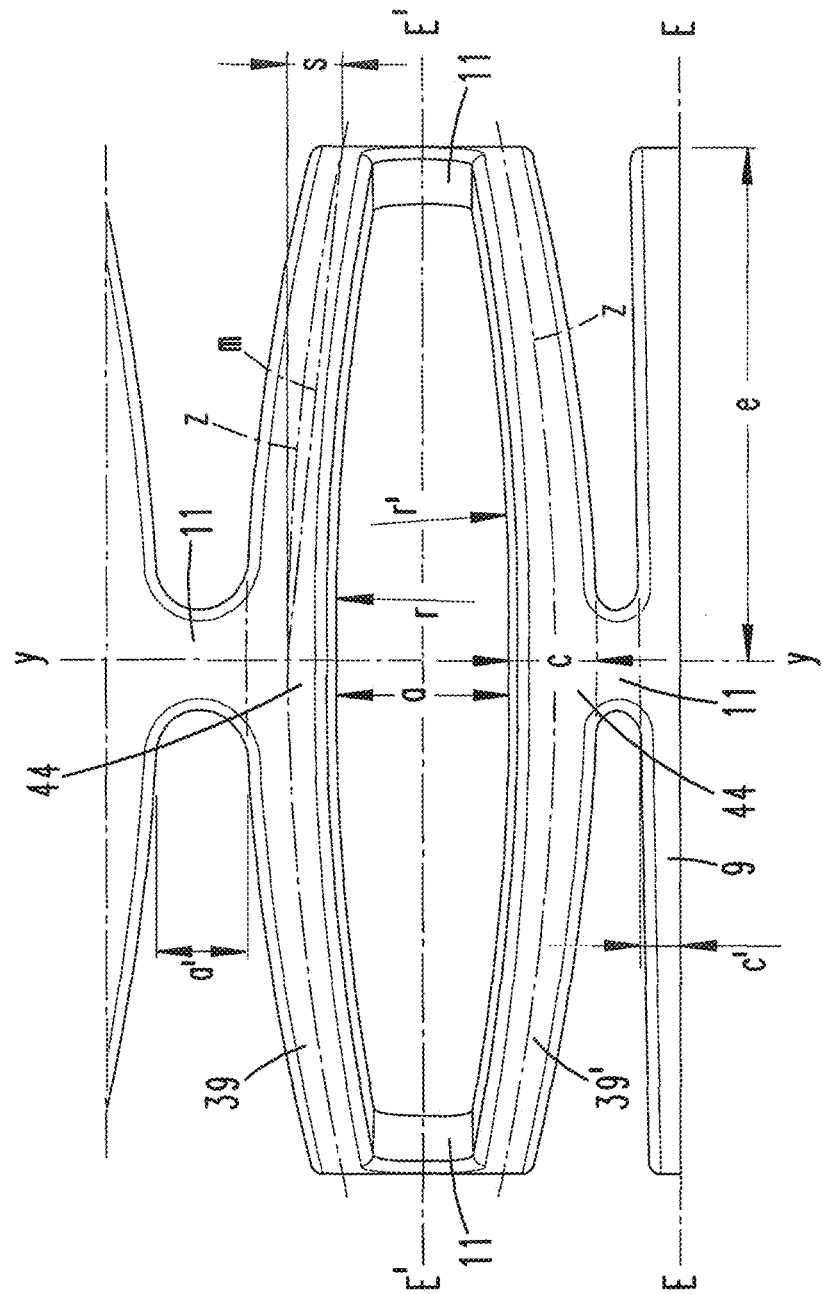

PLASTIC SPRING

CROSS REFERENCE TO RELATED APPLICATIONS

This application is the National Stage of PCT/EP2020/051698 filed on Jan. 24, 2020, which claims priority under 35 U.S.C. § 119 of German Application No. 10 2019 102 186.3 filed on Jan. 29, 2019 and German Application No. 10 2019 132 345.2 filed on Nov. 28, 2019, the disclosures of which are incorporated by reference. The international application under PCT article 21(2) was not published in English.

FIELD OF TECHNOLOGY

The invention relates to a plastic spring comprising a lower spring ring and an upper spring ring, which are arranged essentially coaxially to one another, wherein a plane, which is in each case spanned by the spring rings, extends essentially perpendicular to a longitudinal axis of the plastic spring, and wherein, in addition, the spring rings are connected to one another compressibly by means of spring legs, which extend over more than 90 degrees in the circumferential direction, wherein the spring legs run into the lower and/or upper spring ring in a transition portion, wherein a spring leg further has a central longitudinal axis, which follows the curved progression of the spring leg.

PRIOR ART

A plastic spring of the type in question is known, for example, from JP 4759432 B2. In addition to the upper and the lower spring ring, this spring has an intermediate ring, which is aligned coaxially to the longitudinal axis and parallel to the upper and the lower spring ring. Spring legs, which, viewed in the circumferential direction, in each case extend by 90 degrees to approximately 180 degrees, in each case extend between the lower spring ring and the intermediate ring as well as between the intermediate ring and the upper spring ring, wherein an end, which runs out, of a spring leg extending between the intermediate ring and the upper spring ring is assigned to an end of a spring leg, which runs into the intermediate ring, between the lower spring ring and the intermediate ring.

A plastic spring is known from WO 2018/126397 A1, which has a plurality of wave-shaped intermediate rings, which are arranged on top of each other and which are in each case formed to directly transition into one another. A plastic spring comprising an intermediate ring and in each case two spring legs, which run spirally and the connections of which to the intermediate ring are also offset from one another by 180° is known from US 2009/0102106 A1. A plastic spring is known from FR 2969241 A1, comprising intermediate legs, which extend over the circumference with less than 90° and which essentially in a side view run in a straight manner and which run into the intermediate rings with unchanged cross section. A plastic spring is known from WO 2009/094793 A1, in the case of which two intermediate rings are formed, which run in an oppositely curved manner between an upper and a lower spring ring and which are connected to one another by means of spring legs, which run in a straight manner and which are formed so as to be located oppositely. The intermediate rings and the spring rings have an identical width in the axial direction. A plastic spring is known from DE 2005 063 497 B4, which has only one spring leg, which is comparatively very wide and runs spirally. A plastic spring, which is used in the case of a shoe, is known from U.S. Pat. No. 9,826,797 B2. Spring legs, which run in an inclined manner, extend between two spring rings.

Such a plastic spring can, and preferably, be produced integrally and of the same material, for example in the plastic injection molding process.

SUMMARY OF THE INVENTION

Based on the described prior art, the invention deals with the object of specifying a plastic spring, which is formed in an advantageous manner, in particular with regard to a force development as part of a compression.

This object is initially solved in the case of the subject matter of one aspect of the invention, which focusses on that the plastic spring has several pairs of consecutive intermediate rings with oppositely curved progression over the extension of the longitudinal axis, and that a width, provided in the direction of the longitudinal axis, of an intermediate ring is moreover larger by 10 percent or more than a width, provided in the same direction, of the lower and/or upper spring ring, that four intermediate rings are provided, that the intermediate rings run in a curved manner with respect to a projection into a vertical plane, wherein a wave shape of the intermediate rings in each case results in the circumferential direction, comprising two diametrically opposite concave curvature regions and two convex curvature regions, which are offset by 90 degrees thereto in the circumferential direction and which are likewise located diametrically oppositely, so that an intermediate ring in the manner of a waved spring ring is formed circumferentially, wherein two intermediate rings are in each case designed identically, wherein the intermediate rings are aligned identically in the circumferential direction, while the intermediate rings are offset around the longitudinal axis by 90 degrees relative to the intermediate rings, so that two pairs of consecutive intermediate rings with oppositely curved progression are at hand.

This object is further solved in the case of the subject matter of another aspect of the invention, which focusses on that only two spring legs are provided, that the spring legs are only connected to the spring rings, and that the transition portion, based on a run-in plane perpendicular to the central longitudinal axis in the run-in region into the spring ring, has a width, which is larger by 30 percent or more than in a cross sectional region approximately in the center of the longitudinal extension of the spring leg.

This object is moreover solved in the case of the subject matter of a further aspect of the invention, which focusses on that with respect to a view radially from the outside, each spring leg runs in a wave-shaped manner, in each case with a half wave assigned to a free region between two rings, a spring ring and an intermediate ring or two intermediate rings, and that a connection to an intermediate ring is at hand in the region of a wave crest or of a wave trough, and that with respect to a circumferential extension of a spring leg, a spring leg longitudinal axis results between the upper spring ring and the lower spring ring, said longitudinal axis being crossed several times, preferably four times, by the spring leg over the height of the plastic spring, wherein such a crossing is at hand on half of an extension path of a spring leg portion between two rings.

In an embodiment, foot-like widening regions comprising a respective width, which significantly exceeds the usual width of the spring leg approximately centrally in a spring leg portion extending freely between the lower and the upper spring ring thus result in the transition region from the spring leg into the respective spring ring. A corresponding width can thus correspond, for example, to 1.5-times or more, further for example up to 5-times, the width measured approximately in the center of the longitudinal extension of the spring leg. This central spring leg portion can thereby, and preferably, have a correspondingly smallest width perpendicular to the central longitudinal axis of the spring leg.

The width resulting in the run-in region can furthermore further for example correspond approximately to 1.8- to 2.5-times, further approximately to 2-times, the width in the central region of the spring leg.

Due to the proposed design, a favorable behavior of the plastic spring results in particular with regard to the force development, but furthermore at least also with respect to a plastic deformation. A more favorable force introduction from the spring rings into the spring legs and vice versa thus results in particular as a result of the widened run-in regions.

Directly in the run-in region, the central longitudinal axis of the spring leg following the curved progression can extend essentially perpendicular to the circumferential extension of the subsequent spring ring, therefore further preferably at least approximately spatially parallel to the longitudinal axis of the plastic spring as a whole. Directly in the run-in region of the spring leg into the spring ring, the central longitudinal axis can thereby also draw an acute angle of a few angular degrees, for example of 0.1 to 10 degrees, to a line, which intersects the run-in point of the central longitudinal axis into the spring ring and which runs parallel to the longitudinal axis of the plastic spring.

Distributed over the circumference, at least four spring legs can extend in in each compartment between a spring ring and an intermediate ring as well as between two intermediate rings, which directly follow one another in the direction of extension of the longitudinal axis. The spring leg arrangement can therefore be identical in each compartment at least with regard to the number and design of the spring legs.

According to a possible design, three intermediate rings, which, viewed over the extension of the longitudinal axis, can be evenly spaced apart from one another and also evenly from the upper or lower spring ring, respectively, can thus extend between the lower spring ring and the upper spring ring.

Four to, for example, twelve spring legs, further for example, and preferably, six to ten spring legs, in particular eight spring legs, can also be provided evenly distributed over the circumference.

With respect to the specified oppositely curved progression of two intermediate rings, which, viewed along or in the direction of the longitudinal axis, respectively, directly follow one another, results, for example, during a projection of the intermediate rings in a plane, in which plane the longitudinal axis presents itself as line.

Viewed in the direction of the longitudinal axis, a (first) intermediate ring can thus have a convex curvature with respect to the viewing direction, while the (second) intermediate ring following in the same viewing direction can have a concave curvature progression. Based on the above-described example, the first intermediate ring can also be curved, for example concavely, while the subsequent second intermediate ring can have a convex curvature progression.

Viewed over the circumference, the respective curvature of the consecutive intermediate rings can be at hand evenly, but in the alternative, also unevenly, wherein the respective gradient or the gradient progression, respectively, of the consecutive intermediate rings can be designed identically in consideration of the opposite nature. In the alternative, a different gradient progression is also possible in this respect.

Viewed over the extension of the longitudinal axis, the plastic spring can also have several pairs of consecutive intermediate rings, with oppositely curved progression.

In a possible projection into the above-described plane, an intermediate ring can moreover have a concave or convex curvature, while in a further projection into a plane, which is rotated around the longitudinal axis by 90 degrees, this intermediate ring can be formed so as to run oppositely curved, therefore so as to run convexly or concavely. Further viewed over the circumference, a wave-shaped progression of an intermediate ring can thus result.

In the case of a preferably identical design of the intermediate rings, which follow one another in the longitudinal direction, the above-described opposite curvature can be attained by means of a relative offset of the one intermediate ring to the other intermediate ring in the circumferential direction around the longitudinal axis, thus for example, and preferably, as a result of a circumferential offset by 90 degrees.

The run-in region between spring leg and spring ring, but optionally also between spring leg and intermediate ring, viewed radially from the outside and based on a circumferential direction of the spring ring (or intermediate ring, respectively), can thus have a first run-in radius on one side, and located oppositely in the circumferential direction, a second run-in radius, wherein the second run-in radius is significantly smaller than the first run-in radius.

The run-in radii can thereby be a few millimeters up to 10 or 15 mm, thus further for example 2, 3, or 5 mm, or also 8, 9, or 10 mm, wherein the larger run-in radius can dimensionally correspond to, for example, 1.5- to 5-times, further for example to 2- to 3-times, the smaller run-in radius.

The second, dimensionally smaller run-in radius can, and preferably, be assigned to the gusset-like transition portion between spring leg and spring ring, in which the central longitudinal axis, which follows the curved progression of the spring leg, draws an acute angle of, for example, 10 to 15, up to 45 degrees, to the plane, which is spanned by the spring ring. The first, dimensionally larger run-in radius can therefore be assigned to the transition portion, in which the central longitudinal axis of the spring leg draws an obtuse angle to the plane of the spring ring (in each case viewed in the circumferential direction radially from the outside).

Based on the cross section in the run-in plane, the second run-in radius can also be formed at a reducing portion of the cross section. In particular in the transition portion, further in particular in the run-in region, the spring leg can consist essentially of a region, which has a larger cross section and a region, which forms the reducing portion and which is reduced with respect to its cross sectional surface. The reducing portion can thereby, and preferably, be formed so as to face the above-described gusset between spring leg and spring ring.

In a view radially from the outside, the reducing portion can be formed to initially and essentially be triangular, preferably with rounded contours located oppositely in the circumferential direction. A rounded contour can thereby essentially directly form the second run-in radius.

The triangular shape can at least partially fill the gusset region between spring leg and spring ring.

In continuing longitudinal extension of the spring leg, the reducing portion can also have a branch of approximately constant width extension, wherein the width extension with respect to a largest width in the triangle region can correspond to one-half or less, preferably to one-third or less, up to one-fifth, or one-twentieth or less.

The branch preferably transitions continuously into the triangle portion, which at least partially fills the gusset region between spring leg and spring ring.

In particular starting at the triangle region of the reducing portion, the branch can extend only over a part of the longitudinal extension of the spring leg, according to a preferred design. In this respect, an extension length of the reducing portion as a whole, therefore of triangle portion and branch, can thus result, which can correspond to 0.3- to 0.8-times, further approximately to 0.4- to 0.6-times, optionally approximately to 0.5-times, the extent of longitudinal extension of the spring leg between the run-in planes into the lower and the upper spring ring.

A second triangle region and/or branch can moreover be molded located oppositely, starting at the other spring ring. The reducing portion formed in this way, which faces the other spring ring, for example the upper spring ring, can be provided located essentially diametrically oppositely to the reducing portion of the reducing portion, which faces the other spring ring, for example the lower spring ring, with respect to the central longitudinal axis of the spring leg and with respect to a cross section perpendicular to this central longitudinal axis. A mutual extension of reducing portions along a spring leg can therefore result.

The branch of the one reducing portion can thereby end in a cross sectional surface of the spring leg, out of which cross sectional surface the branch of the other reducing portion can grow in the direction of the other spring ring.

In a possible design, the branches of the two reducing portions can partially overlap in the longitudinal extension along the central longitudinal axis, thus for example over 2 to 10 percent, further for example 5 percent, of the total length of extension of the spring leg.

The reducing portions consisting of triangle regions and branches are preferably formed integrally with and of the same material as the spring leg and thus preferably with the spring as a whole.

With respect to the design of the plastic spring comprising two or more intermediate rings, a circumferential extension of 10 degrees or more, up to 90 degrees, further preferably a circumferential angular range of from 10 to 20, further preferably approximately 15 degrees, can result in each case with respect to the spring legs.

With respect to a circumferential extension of a spring leg, a spring leg longitudinal axis can result between the upper spring ring and the lower spring ring. This longitudinal axis can, and preferably, be crossed at least twice by the spring leg, viewed over the height of the plastic spring. A zigzag-like or sine wave-like progression of the spring leg can thus result over the height of the plastic spring. In the case of a, for example, wave-like progression of the spring leg, a half wave of the spring leg, which transitions into an oppositely running half wave in the next compartment by crossing in particular the intermediate ring, can be formed each compartment between two rings, i.e. between a spring ring and an intermediate ring or between two consecutive intermediate rings.

The connection of the rings, both of the spring rings and of the intermediate rings, which is preferably of the same material and integral, to the spring legs can, and preferably in each case be reached in the zenith of a wave of the spring leg.

Both ends of the spring leg can thereby run into the lower and upper spring ring on the same circumferential side to the spring leg longitudinal axis. In the alternative, the ends of a spring leg can run into the spring rings on different circumferential sides to the longitudinal axis The plastic spring can moreover be closed in the circumferential direction by means of wall regions, which connect the spring legs to the spring rings. These wall regions can thereby partially or also completely close the intermediate spaces, which result between the spring legs and the spring rings and/or the intermediate rings in the spring casing wall, wherein these wall regions further preferably do not or do not essentially influence the properties of the plastic spring with respect to spring force and resilience. The wall regions, in contrast, act in the manner of a thin-walled lining, wherein these wall regions can further also be produced of the same material as and integrally with the spring legs and the spring rings.

A wall region can thereby have a radial thickness, which corresponds to less than half, up to one-fiftieth, of the radial thickness of a spring leg. The radial thickness can thus further correspond approximately to one-twentieth, to one-thirtieth, of the radial thickness of a spring leg. Such a small radial thickness can make it possible for the wall region to turn inwards or turn outwards radially to the inside or radially to the outside in the course of a compression process, so that a bellows-like effect with respect to the wall regions can result.

In particular in connection with intermediate rings, which run in a curved manner, it can further be provided that the intermediate rings, viewed from a central plane between two intermediate rings, which runs perpendicular to the longitudinal axis, in each case run in a concavely curved manner or in each case run in a convexly curved manner. In the above-described central plane, the longitudinal axis presents itself as point. Viewed from this central plane, concave or convex curvatures, respectively, of both intermediate rings, which follow one another in the direction of the longitudinal axis, or circumferential portions of the intermediate rings, respectively, result in both directions along the longitudinal axis.

In the region of their curvature turning points (zenith), in the case of a respective convex progression of the curvature, the intermediate rings can thereby have a maximum distance to one another, viewed in the axial direction, and, in the region of their curvature turning points, in the case of a respective concave progression of the curvature, a minimum distance, viewed in the axial direction.

According to a possible design, a width, provided in the direction of the longitudinal axis, of an intermediate ring can moreover be larger by 10 percent or more, for example up to 25 or 50 percent or more, than a width, provided in the same direction, of the lower and/or upper spring ring. The above-described width of an intermediate ring can thus further correspond, for example, to 1.1-times to approximately 2-times, the width of a spring ring.

With respect to the used plastic, a polyolefin can be preferred, thus in particular PBT (polybutylene terephthalate) or also COC (cycloolefin copolymers). Polypropylene with fillers can moreover also be used. The e-module preferably lies between 1900 and 3000 MPA.

The plastic spring has an optimal spring characteristic, in the case of which a force, which is then constant with respect to the further press-down, can be provided after a first rise of the spring force in the course of a press-down.

With regard to the disclosure, the ranges or value ranges or multiple ranges, respectively, specified above and below also include all intermediate values, in particular in 1/10 steps of the respective dimension, optionally also without dimension. For example, the designation 1.5- to 5-times also includes the disclosure of 1.6- to 5-times, 1.5- to 4.9-times, 1.6- to 4.9-times, etc., the disclosure of 0.1 to 10 degrees also includes the disclosure of 0.2 to 10 degrees, 0.1 to 9.9 degrees, 0.2 to 9.9 degrees, etc., the disclosure of 10 to 15 mm also includes the disclosure of 10.1 to 15 mm, 10 to 14.9 mm, 10.1 to 14.9 mm, etc. On the one hand, this disclosure can serve to limit a mentioned range limit from below and/or the top, but in the alternative or additionally can serve to disclose one or several singular values from a respective specified range.

BRIEF DESCRIPTION OF THE DRAWINGS

The invention is described below on the basis of the attached drawing, which, however, only represents exemplary embodiments. A part, which, is only described on the basis of one of the exemplary embodiments and which is not replaced by another part in the case of a further exemplary embodiment due to the special feature highlighted there, is thus also described for this further exemplary embodiment as at least possibly available part. In the drawing:

FIG. 1 shows a longitudinal section through a dispenser comprising a plastic spring, relating to an initial position;

FIG. 2 shows a sectional illustration according to FIG. 1, but relating to a dispensing position;

FIG. 2a shows a sectional illustration according to region IIa in FIG. 2, rotated by 90 degrees around a spring longitudinal axis;

FIG. 5 shows the plastic spring of the first embodiment in top view;

FIG. 6 shows the side view against the plastic spring according to arrow VI in FIG. 5;

FIG. 7 shows the side view according to arrow VII in FIG. 5;

FIG. 8 shows the section according to the line VIII-VIII in FIG. 6;

FIG. 9 shows the section according to the line IX-IX in FIG. 6;

FIG. 10 shows the section according to the line X-X in FIG. 7;

FIG. 17 shows the section according to the line XVII-XVII in FIG. 16;

FIG. 18 shows the enlargement of the region VXIII in FIG. 17;

FIG. 19 shows a sectional illustration according to FIG. 17, but relating to the compressed position of the plastic spring;

FIG. 24 shows the enlargement of the region XXIV in FIG. 23.

DESCRIPTION OF THE EMBODIMENTS

Figure 3:
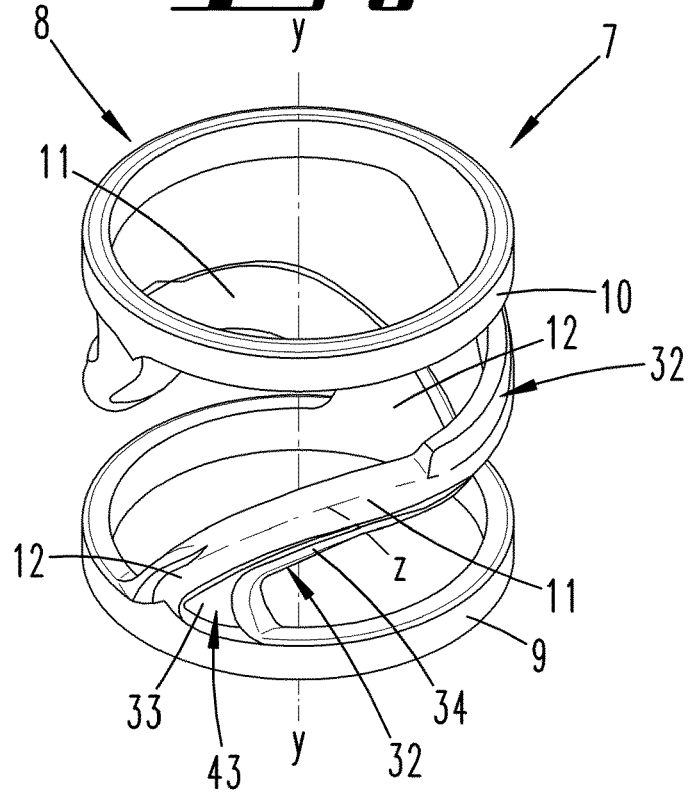
FIG. 3 shows a plastic spring in a first embodiment, as it is also used in the dispenser according to FIGS. 1 and 2, in perspective individual illustration.
Figure 4:
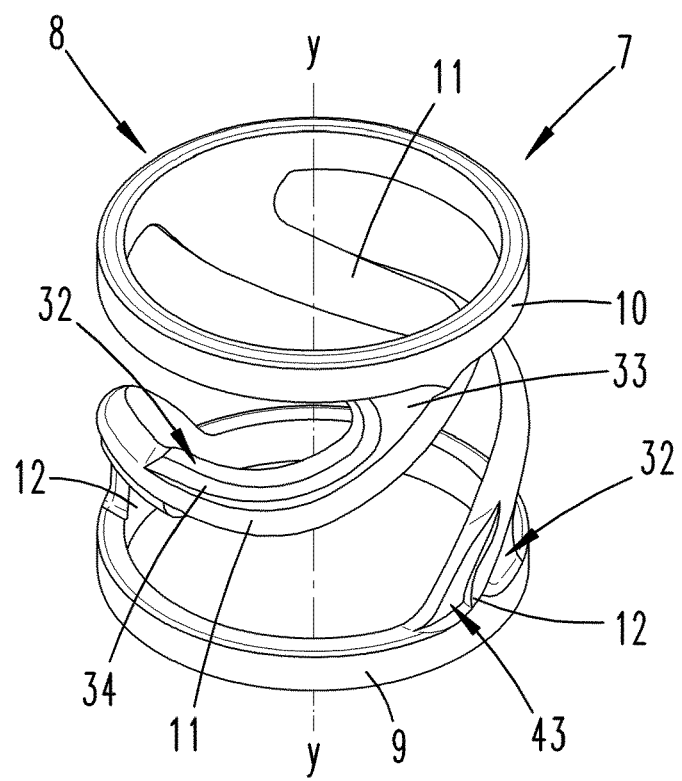
FIG. 4 shows the plastic spring according to FIG. 3 in a further perspective illustration.

What is illustrated and described, initially with respect to FIGS. 3 to 7, is a plastic spring 8 comprising a lower spring ring 9 and an upper spring ring 10, which are compressibly connected to one another via spring legs 11, wherein the spring legs 11 run into a transition portion in the respective spring ring 9, 10.

The dispenser 1, which is illustrated, for example, in FIG. 1, can have a hollow-cylindrical storage container 6. The dispenser pump 3 is secured, for example screwed or locked, on said storage container. In the non-use position according to FIG. 1, the dispenser pump 3 can be covered by a non-illustrated cap.

The molded parts of the dispenser 1 preferably consist of a plastic material, such as, for example, polyethylene, and are preferably produced in the injection molding process. The valves, which can consist of a rubber-like material, which can be a TPE (and which can therefore also be used in the injection molding process), but which is preferably vulcanized in the case of the exemplary embodiment, are significant exceptions at least in the case of the illustrated exemplary embodiment.

A follower plunger 13, via which the mass 2 to be dispensed is transported in the direction of the dispenser pump 3, can be positioned in the storage container 6.

The dispenser pump 3 essentially consists of a pot-shaped bottom part 14, which forms a partition wall to the storage container 6, a pumping chamber 4 comprising an inlet valve 15 and an outlet valve 16, and a head piece 5, which is supported on a resetting device 7 in the form of a plastic spring 8.

Bottom part 14, pumping chamber 4, the resetting device 7 in the form of a plastic spring 8, and an outer wall 17 of the head piece 5 can be arranged in a rotationally symmetrical manner on a common axis x, which axis x can simultaneously also form the body axis of the storage container 6.

The pot base 18 of the bottom part 14 has a central opening 19, from which for example star-shaped slot-like inlet openings emanate. The latter are covered by a flexible closure plate, which shapes the inlet valve 15.

A cylinder wall 20 for shaping the pumping chamber 4 emerges from the pot base 18 radially outside the inlet valve 15. A pump plunger 21 is movably held in the axial direction in this pumping chamber 4.

Preferably distributed evenly around the axis x, the pump plunger 21 is provided with passage openings 22, which form the outlet valve 16, together with a further flexible closure plate, which covers said passage openings on the side facing away from the inlet valve 15. This outlet valve 16 is enclosed by a hollow-cylindrical pump plunger part 23, which forms a neck and which forms the connection to the head piece 5.

The head piece 5 engages with a central cylindrical hollow body 24 into the pump plunger part 23. The head piece 5 and the pump plunger 21 are firmly connected to one another in this overlap region.

In the end region facing the outlet valve 16, the hollow body 24 transitions into a central holding-down device 25, which is directed towards the flexible closure plate of the outlet valve 16 and which acts on the assigned closure plate.

The hollow body 24 shapes a dispensing channel 26. Initially starting at the end region of the hollow body 24 facing the outlet valve 16, said dispensing channel runs in the axial extension and finally transitions into a laterally tapering region comprising an end-side dispenser opening 42. This region is arranged directly below an actuating surface of the head piece 5, which runs at an incline to the axis x with respect to a perpendicular plane.

The head piece 5 and the pump plunger 21 connected thereto are spring-loaded in the direction of the upper stop position. The resetting device 7 in the form of a plastic spring 8 brings this load.

The plastic spring 8 is supported on the foot side in the region of the pot base 18 of the bottom part 14. On the head side, the plastic spring 8 loads the head piece 5 as a result of bottom-side loading of a collar 28, which is integrally molded to the hollow body 24 and which protrudes radially to the outside.

Along its circumferential edge, this collar 28 supports a radially outer support shaping 29, which is directed from the collar 28 in the direction of the bottom part 14.

As a whole, the support shaping 29 and the collar 28 are designed in an approximately pot-like manner, comprising a pot opening, which points downwards in the direction of the bottom part 14.

The support shaping 29 is diameter-enlarged with respect to the cylinder wall 20, which moreover forms a radially inner support shaping 30, wherein a radial distance dimension between a wall inner side of the radially outer support shaping 29 and an outer wall of the radially inner support shaping 30 located oppositely can preferably be adapted to a largest, radial thickness dimension d of the plastic spring 8 in the region of an upper spring ring 10 and/or of a lower spring ring 9 and/or of a spring leg 11.

An annular space thus results, which extends circumferentially coaxially to the axis x and in which the plastic spring 8 is preferably received.

The radially outer support shaping 29 can, and as illustrated, be encompassed circumferentially radially on the outside by means of a guide wall 31, which emerges from the pot base 18 in the axial direction of the head piece 5.

The mode of operation of the dispenser 1 is known in that a portioned amount of a paste-like mass 2 is dispensed by means of pumping movement of the head piece 5 and change of negative and positive pressure associated therewith. By means of pressure application to the head piece 5 and downwards displacement of the latter associated therewith, a positive pressure is generated in the pumping chamber 4, as a result of which the portion stored in this pumping chamber 4 can escape through the opened outlet valve 16 and the dispensing channel 26. The inlet valve 15 is closed as a result of positive pressure.

The downwards displacement of the head piece 5 with the pump plunger 21 takes place against the spring resetting force of the plastic spring 8.

After removing the force acting on the head piece 5, it resets automatically into the initial position due to the spring loading.

Figure 11:
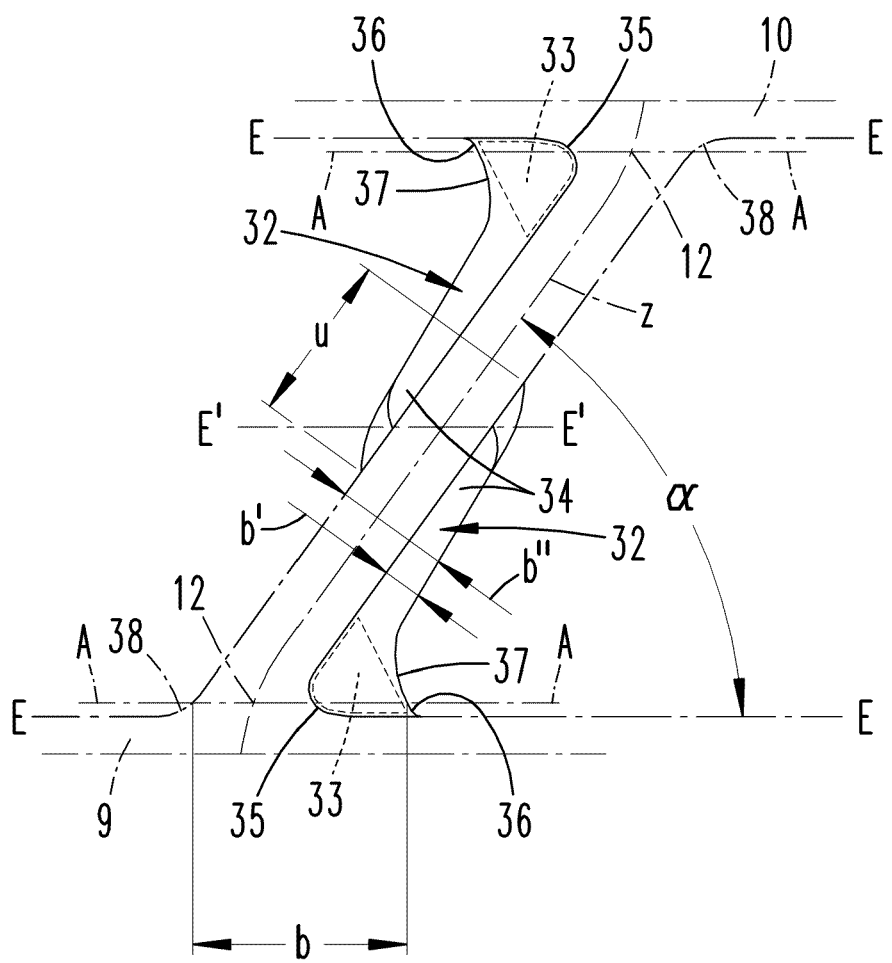
FIG. 11 shows an unwinding of a spring leg comprising portions of spring rings, into which the spring leg runs, reproduced in dot-dashed line type, and reducing portions of the spring leg in solid line illustration.

The plastic spring 8 of the first illustrated embodiment according to the drawings in FIGS. 3 to 11 initially and essentially has a lower spring ring 9 and an upper spring ring 10, which are aligned coaxially to a longitudinal axis y. In the installed state, the longitudinal axis y coincides with the axis x of the dispenser 1.

The spring rings 9 and 10 are aligned such that a plane E, which is in each case spanned by a spring ring 9 or 10, respectively, extends essentially perpendicular to the longitudinal axis y.

The spring rings 9, 10 are spaced apart from one another in the axial direction and are compressibly connected to one another via spring legs 11.

In the illustrated exemplary embodiment, the plastic spring 8 has two such spring legs 11. Each spring leg 11 thereby extends over more than 90 degrees, preferably up to approximately 180 degrees, viewed in the circumferential direction of the plastic spring 8, in the course of the extension thereof, starting at the lower sprig ring 9 to the upper spring ring 10.

Each spring leg 11 can thereby have a geometric central longitudinal axis z, which follows the curved progression, for example from the transition portion 12 into the lower spring ring 9 to the transition portion 12 into the upper spring ring 10.

With respect to this central longitudinal axis z, each spring leg 11 can draw an acute angle α of approximately 15 to 45 degrees, further approximately 30 to 45 degrees, to the respective spring ring 9 or 10 or to the plane E, which is spanned by the spring rings, respectively, in a side view, in which the plane E as well as the central longitudinal axis z present themselves as lines.

In particular the spring leg 11 of the plastic spring 8 is supported in the annular space between the cylinder wall 20 and the guide wall 31 in the radial direction, in particular in the radial direction to the outside by means of the guide wall 31. The spring leg 11 or both spring legs 11, respectively, can, and preferably, therefore be prevented from a radial deflection as part of the spring compression, as it is illustrated in an exemplary manner in FIG. 2, further in particular from a radial deflection to the outside. Such a theoretical radial deflection to the outside is suggested in the illustration in FIG. 2a in dot-dashed line type.

In the case of spring legs 11, which are in particular guided radially on both sides, and in the case of associated prevention of a radial deflection of the spring legs 11, a rotation of the one or of both spring rings 9, 10 can result in the seats thereof.

Figure 12:
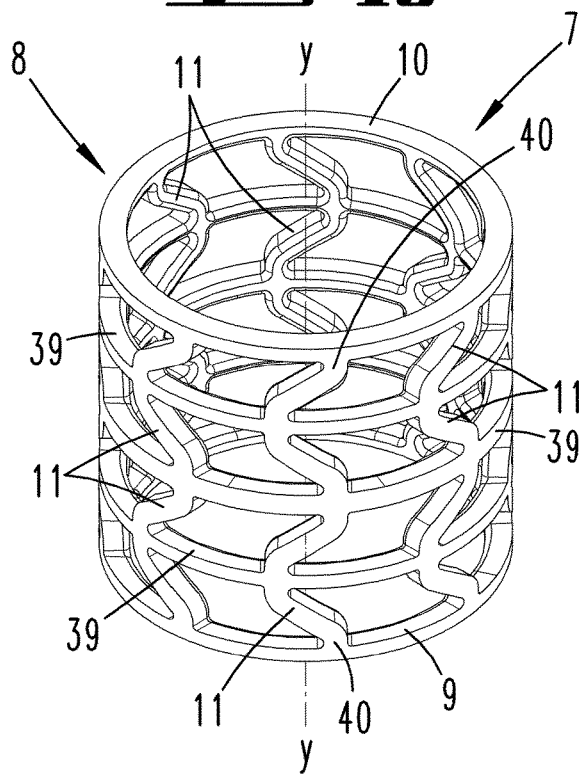
FIG. 12 shows a plastic spring in a second embodiment in perspective illustration.
Figure 13:
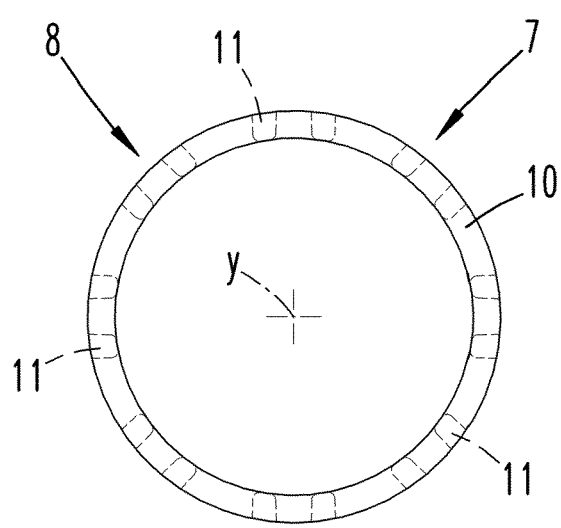
FIG. 13 shows the top view thereto.
Figure 14:
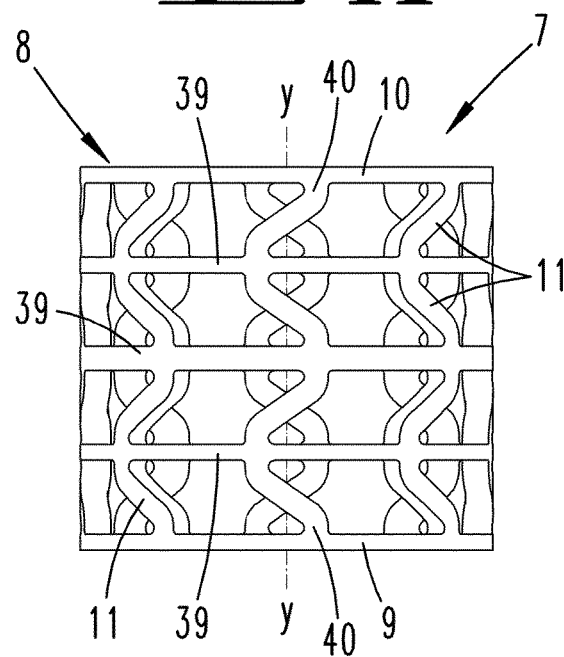
FIG. 14 shows the side view according to arrow XIV in FIG. 13.
Figure 15:
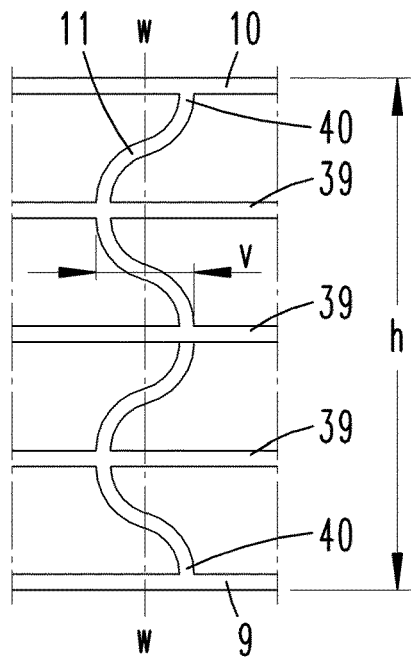
FIG. 15 shows a spring leg in side view comprising portions of spring rings and intermediate rings, which are connected to the spring leg, in an enlarged individual illustration.
Figure 16:
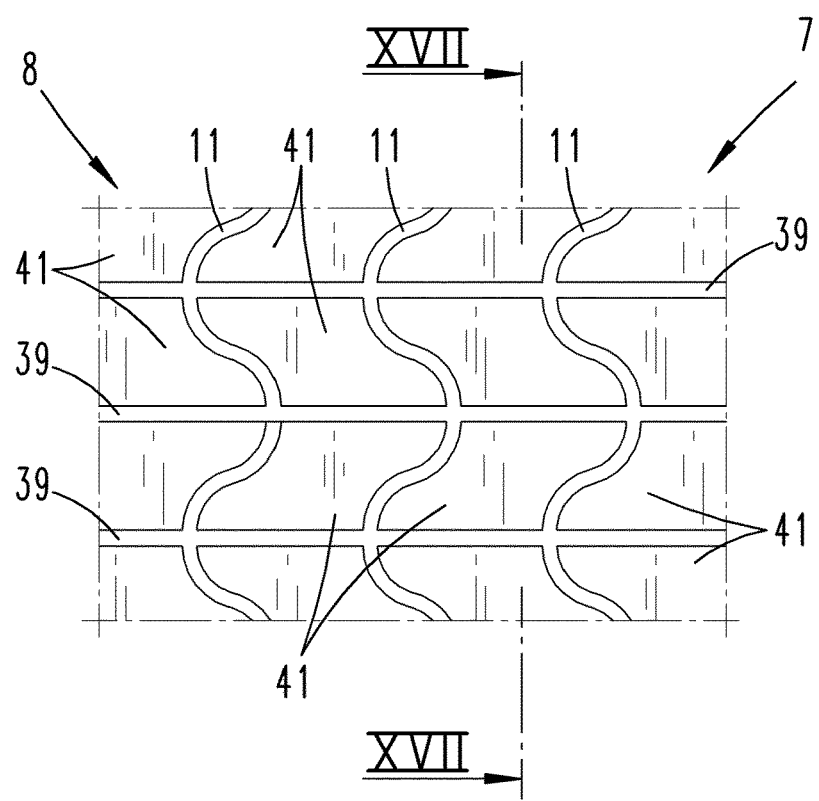
FIG. 16 shows a sectional illustration of a side view against a plastic spring in a third embodiment.

Each spring leg 11 of the first embodiment illustrated in FIGS. 1 to 11, but moreover optionally also with respect to the further embodiments in FIGS. 12 to 18, can have at least one reducing portion 32 with respect to a cross section perpendicular to the central longitudinal axis z. Viewed on the longitudinal axis y, this reducing portion 32 can have a radial thickness d', which can correspond to 0.3- to 0.95-times, further approximately to 0.6- to 0.9-times, the thickness d of the portion of the spring leg 11, which is not reduced.

The reducing portion 32 can moreover preferably be formed so as to be assigned to the gusset region of the respective spring leg 11 having the acute angle α, wherein two such reducing portions 32, which, viewed in the direction of extension of the longitudinal axis y, overlap approximately centrally of the longitudinal extension of the spring leg 11, can preferably be provided at one spring leg 11.

With respect to a cross section through a spring leg 11 in the central region of the longitudinal extension of the spring leg 11 according to the illustration in FIG. 10, a vertical position opposite to the reducing portion 32 can preferably result.

With respect to a view radially from the outside, each reducing portion 32 can, and as illustrated, consist of a triangle portion 33, which fills the gusset region between spring leg 11 and the respective spring ring 9 or 10, respectively, and a branch 34, which adjoins thereon and extends essentially in the longitudinal extension of the spring leg 11.

Viewed in the circumferential direction, each triangle region 33 can thereby form oppositely rounded contours, thus a rounded contour 35 directly in the gusset-like transition from the non-reduced portion of the spring leg 11 into the respective spring ring 9 or 10 on the one hand, and, viewed in the circumferential direction, a free rounded contour 36, which forms a second run-in radius 37 for the spring leg 11 as a whole, wherein the corresponding radius dimension can correspond to larger than, for example, 1.5- to 3-times, further approximately to 2-times, the radius dimension in the region of the first rounded contour 35.

Each spring leg 11 moreover also has a first run-in radius 38, which is assigned to the obtuse angle between spring leg 11 and the respective spring ring 9, 10. With respect to the second run-in radius 37, said first run-in radius is selected to be dimensionally larger, thus corresponds, for example, approximately to 1.5- to 5-times, further approximately to 2- to 3-times, the second run-in radius 37.

The branch 34, which adjoins the triangle region 33 in the longitudinal extension of the spring leg 11, can—based on a cross section perpendicular to the central longitudinal axis z (see, for example, FIG. 9)—have a width b', which remains constant at least approximately over the longitudinal extension of the branch 34 and which can correspond approximately to 0.1- to 0.5-times, further approximately to 0.15- to 0.25-times, the total width b" of the spring leg 11, viewed in the same direction, including the reducing portion 32 in this region.

The branches 34 of the reducing portions 32 can, as illustrated, extend beyond a central plane E, which centrally traverses the longitudinal axis y between the planes E. The overlap dimension u, which optionally results thereby, can correspond approximately to the width dimension b', optionally approximately to 3- to 10-times, of this width dimension b' of a branch 34.

In a run-in plane A, which is viewed perpendicular to the central longitudinal axis z and which preferably runs parallel to the plane E, the enlarged transition portion 12 between a spring leg 11 and a spring ring 9, 10, which generates a favorable force development as part of the compression and/or of the resetting of the plastic spring 8, shows a width b, which is larger by 30 percent or more, than in a cross sectional region of the spring leg 11, approximately centrally of the longitudinal extension of the spring leg 11, for example according to the illustration in FIG. 9. When cutting the rounded contours 35 and 36, and thus when cutting both the reduced and the non-reduced region by the run-in plane A, this largest width b in the region of this run-in plane A can thereby have a dimension, which corresponds to 1.3- to 1.5-times, further for example for example to 1.5- to 2.5-times, the width b" of the corresponding spring leg 11 in a central region, preferably outside of the overlap region of the reducing portions 32.

As can further be seen from the illustrations, a second reducing portion 43 can moreover also be formed in the obtuse-angled transition, which has the first run-in radius 38, from the spring ring 9, 10 into the spring leg 11. With respect to the thickness ration, said second reducing portion can be formed to be identical or approximately identical to the non-reduced region of the spring leg 11 within the specified value ranges of the above-described reducing portion 32.

Starting at the transition portion 12, the reducing portion 43 can thereby extend approximately over the distance along the spring leg 11, which can correspond approximately to 0.1- to 0.7-times, further approximately to 0.2- to 0.3-times, the extension length of the first reducing portion 32.

FIGS. 12 to 15 show a further embodiment of the resetting device 7. Here, the latter is preferably also a plastic spring 8 comprising an upper spring ring 10 and a lower spring ring 9, which preferably run offset to one another in the same plane along a longitudinal axis y.

In the illustrated exemplary embodiment, intermediate rings 39, which run essentially perpendicular to the longitudinal axis y, are provided over the height h of the plastic spring 8, therefore over the length of the longitudinal axis y. According to the illustrated exemplary embodiment, three such intermediate rings 39 can be provided. In the alternative, however, only two or more than three, up to five or six, such intermediate rings 39, are also possible in this respect.

The spring rings 9, 10 and the intermediate rings 39 can be designed identically with respect to the outer and/or inner diameters.

The spring rings 9 and 10 as well as the intermediate rings 39 are preferably evenly spaced apart from one another in the longitudinal extension of the longitudinal axis y and are connected to one another via spring legs 11.

Eight such spring legs 11 can, and as illustrated, thus be provided so as to be distributed evenly over the circumference.

Each spring leg 11 is connected to each spring ring 9, 10 and to each intermediate ring 39, in particular of the same material and integrally.

Viewed in the circumferential direction, each spring leg 11 can thereby further extend over a circumferential angular range of approximately 15 to 20 degrees or more, up to, for example, 45 or 60 degrees.

With respect to a view radially from the outside, each spring leg 11 can thereby run in a zigzag- or wave-shaped manner, further optionally in each case with a half wave, assigned to a free region between two rings, thus for example between a spring ring 9 or 10 and an intermediate ring 39 or also between two intermediate rings 39.

With respect to a circumferential extension of a spring leg 11 between the upper spring ring 10 and the lower spring ring 9, a spring leg longitudinal axis w can thus result, which can be crossed several times by the spring leg 11 over the height h of the plastic spring 8, thus according to the illustrated exemplary embodiment four times. Such a crossing is preferably attained on half of an extension path of a spring leg portion between two rings (see in particular FIG. 15).

A connection to an intermediate ring 39 can in each case be at hand in the region of a wave crest and/or of a wave trough.

The two ends 40 of a spring leg 11 of this design can, and as illustrated, run into the lower and/or upper spring ring 9, 10 on the same circumferential side to the spring leg longitudinal axis w.

As can be seen from the illustrations in FIGS. 17 to 19, the free spaces resulting between the spring rings 9, 10 and the spring legs 11, moreover also by including the intermediate rings 39, can be closed by means of wall regions 41 connecting the spring legs 11 and the rings. These wall regions 41 can, and preferably, be formed of the same material as and integrally with the spring legs 11 and the rings, wherein the wall regions 41 can further be provided in a skin-like manner. The wall regions 41 can therefore have a radial thickness d″, which can correspond, for example, to one-fifth to one-twentieth or less, further for example to one-tenth, of the radial thickness d of a spring leg 11 and or of a spring ring 9, 10 and/or of an intermediate ring 39 (see in particular FIG. 18).

Such a wall region 41, which is comparatively thin, to the point of being skin-like, can turn outwards during a compression of the plastic spring 8, as it is outlined on the basis of a section enlargement in FIG. 19, in a bellows-like manner, for example radially to the outside between the intermediate rings 39, the spring rings 9, 10, and the spring legs 11.

In the case of a dispenser 1 according to the above-described exemplary embodiment, the arrangement of the valves 15 and 16 can be forgone by using an above-described plastic spring 8 comprising wall regions 41, which fill the free spaces. The plastic spring 8 formed in this way thereby does not only act as resetting device 7, but moreover also in the manner of a bellows, which builds up a negative pressure for replenishing mass 2 in the resetting movement.

Figure 20:
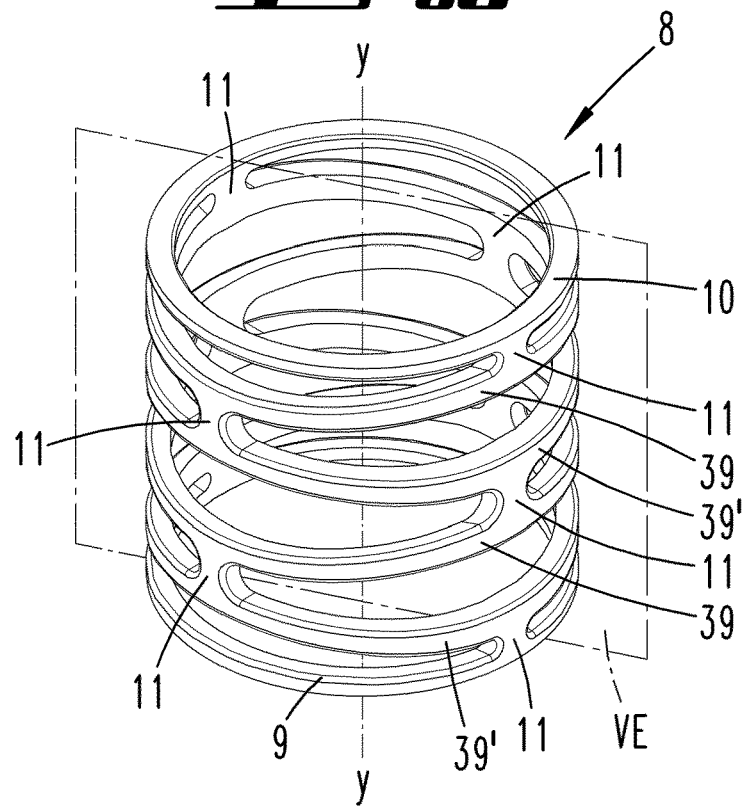
FIG. 20 shows a plastic spring in a further embodiment in perspective illustration.
Figure 21:
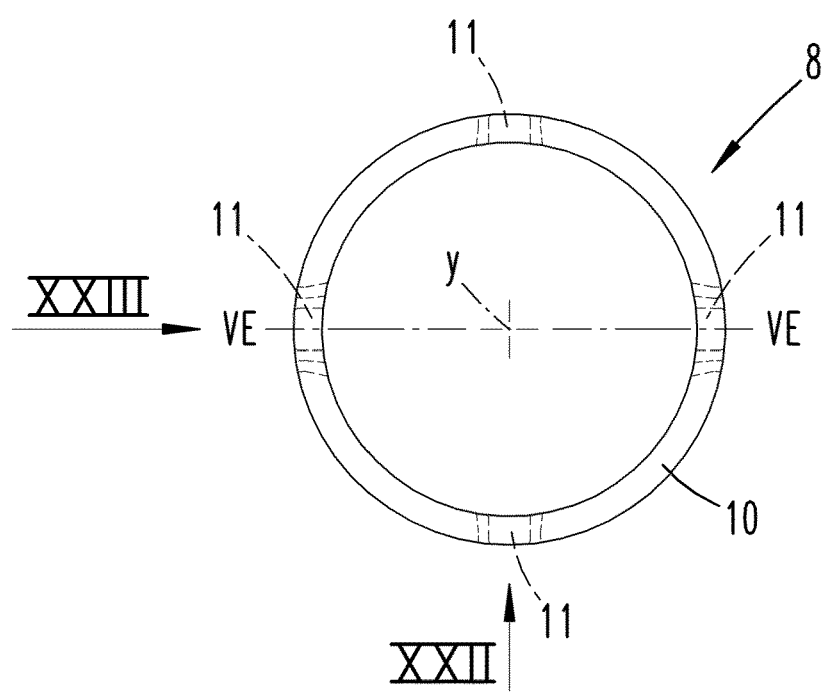
FIG. 21 shows the top view onto the plastic spring according to FIG. 20.
Figure 22:
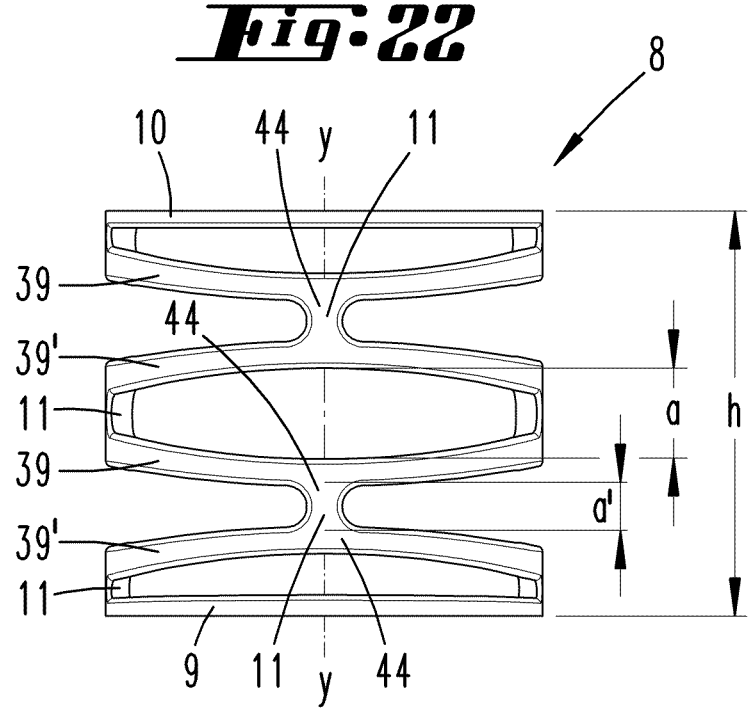
FIG. 22 shows the view against the plastic spring according to the arrow XXII in FIG. 21.
Figure 23:
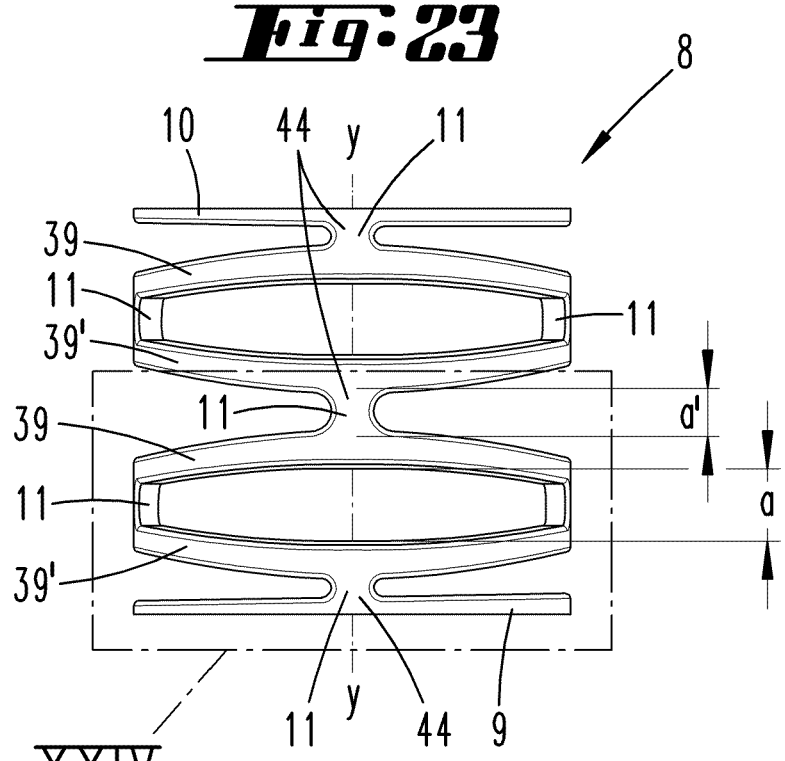
FIG. 23 shows the view against the plastic spring according to the arrow XXIII in FIG. 21.

FIGS. 20 to 24 show a further embodiment of a plastic spring 8 comprising a lower spring ring 9 and an upper spring ring 10, which spring rings 9 and 10 also extend essentially in a plane E, which runs transversely to the longitudinal axis y, in this exemplary embodiment.

Intermediate rings 39 and 39' are provided between the spring rings 9 and 10 over the height h along the longitudinal axis y. They also extend essentially aligned approximately along a plane, which runs transversely to the longitudinal axis y. Four intermediate rings 39 and 39' are provided in the illustrated exemplary embodiment.

The spring rings 9 and 10 are connected to the intermediate rings 39 or 39', respectively, which follow in the direction r or r', respectively, of the longitudinal axis y, via spring legs 11. The intermediate rings 39 and 39', which follow one another in the direction r or r', respectively, are also connected to one another via such spring legs 11. In the illustrated exemplary embodiment, two spring legs 11, which are located diametrically opposite one another with respect to the longitudinal axis y, are provided in each connecting plane between two intermediate rings or between a spring ring and an intermediate ring.

As can in particular be seen from the enlarged illustration in FIG. 24, a width c of an intermediate ring 39 or 39', respectively, viewed in the direction r or r', respectively, of the longitudinal axis y, can correspond approximately to 1.5- to 2.5-times, further approximately to 2-times, the width c' of a spring ring 9 or 10, respectively, viewed in the same direction. These widths c or c', respectively, can thereby, and preferably, be detected along the longitudinal axis y during a projection of the intermediate rings 39 and 39' as well as of the spring rings 9 and 10 into a vertical plane VE, in which the longitudinal axis y presents itself as line (see FIG. 20), wherein this width dimension can refer to a resulting outer edge of the intermediate ring or of the spring ring, respectively, on the one hand, and on an imaginary extension in this projection of an opposite outer edge of the intermediate ring or of the spring ring, respectively, which optionally runs into a spring leg 11, on the other hand.

Further preferably, the intermediate rings 39 and 39' run in a curved manner, in particular with respect to the above-described projection into the vertical plane VE, wherein a wave shape of the intermediate rings in each case results further preferably in the circumferential direction, comprising two diametrically opposite concave curvature regions and two convex curvature regions, which are offset by 90 degrees thereto in the circumferential direction and which are likewise located diametrically opposite with respect thereto. An intermediate ring 39 or 39', respectively, in the manner of a waved spring ring thus results circumferentially.

The intermediate rings 39 and 39' are preferably designed identically, in particular with respect to their wave shape, viewed in the circumferential direction. According to the illustrated exemplary embodiment, the intermediate rings 39 can thereby be aligned identically in the circumferential direction, while the intermediate rings 39' can be offset around the longitudinal axis y by preferably 90 degrees relative to the intermediate rings 39.

Viewed in a direction r (or, in the alternative, also in the direction r') of the longitudinal axis y, two directly consecutive portions of the intermediate rings 39 and 39' run in an oppositely curved manner, so that, viewed, for example, in the direction r, a convex curvature region of the following intermediate ring 39 is located opposite to the concave curvature region of the intermediate ring 39' with respect to the projection into the vertical plane VE. A maximum distance a results here between the intermediate rings 39 and 39', this in particular between the curvature turning regions 44, which are arranged along the longitudinal axis y in the projection plane according to the illustrations.

As can further be seen from the illustrations, the intermediate rings 39 and 39', which are arranged directly one behind the other in the direction r, in each case viewed in the direction r or r', respectively, in each case run in a concavely or in each case in a convexly curved manner from a central plane E', which is aligned transversely to the longitudinal axis y and which extends between these intermediate rings 39 and 39', wherein the maximum distance a results between the convex curvature regions, viewed in the respective direction r or r', respectively, and a minimum distance a' results between the concave curvature regions, which are directed towards one another.

The spring legs 11 are preferably arranged such that they connect intermediate rings 39 and 39', which follow one another in the direction of the longitudinal axis y, in the region of their convex curvature turning regions 44. The connection of the lower spring ring 9 or of the upper spring ring 10, respectively, to the intermediate ring 39 or 39', respectively, which follows in the direction r or r', respectively, preferably also takes place in the convex curvature turning region 44 of the intermediate ring.

With respect to the curvature, it can be an even rise along a central longitudinal axis z of the intermediate rings. In an unwinding of an intermediate ring 39 or 39, respectively, an elongated even wave shape with respect to this central longitudinal axis z can result. A gradient m on average of approximately 7 to 10, further approximately 8 to 9, can result thereby as a function of a radius dimension e, which refers to the central longitudinal axis z, and further as a function of a gradient dimension s of the central longitudinal axis z in the direction of the longitudinal axis y, which can further lead to an average gradient of approximately 10 to 13 percent, further approximately 11 to 12 percent.

The above statements serve to describe the inventions captured by the application as a whole, which further develop the prior art at least by means of the following feature combinations, in each case also independently, wherein two, several, or all of these feature combinations can also be combined, namely:

A plastic spring, which is characterized in that the transition portion 12, based on a run-in plane A perpendicular to the central longitudinal axis z in the run-in region into the spring ring 9, 10, has a width b, which is larger by 30 percent or more than in a cross sectional region approximately in the center of the longitudinal extension of the spring leg 11.

A plastic spring, which is characterized in that, viewed radially from the outside and based on a circumferential direction of the spring ring 9, 10, the run-in region has a first run-in radius 38 on one side, and located oppositely in the circumferential direction, a second run-in radius 37, wherein the second run-in radius 37 is significantly smaller than the first run-in radius 38.

A plastic spring, which is characterized in that the second run-in radius 37, based on the cross section in the run-in plane (A), is formed at a reducing portion 32 of the cross section.

A plastic spring, which is characterized in that in the view radially from the outside, the reducing portion 32 is formed to be essentially triangular, with rounded contours 35, 36 located oppositely in the circumferential direction.

A plastic spring, which is characterized in that in continuation of the longitudinal extension of the spring leg 11, the reducing portion 32 has a branch 34 of approximately constant width extension, wherein the width extension with respect to a largest width b in the triangle region 33 corresponds to one-half or less.

A plastic spring, which is characterized in that the branch 34 extends only over a part of the longitudinal extension of the spring leg 11.

A plastic spring, which is characterized in that a second triangle region 33 and/or branch 34 is molded located oppositely, starting at the upper spring ring 10.

A plastic spring, which is characterized in that the branches 34 partially overlap in the longitudinal extension.

A plastic spring, which is characterized in that two or more intermediate rings 39 are formed and that, distributed over the circumference, at least four spring legs 11 are formed, which extend in the direction of the longitudinal axis y over a circumferential angular range v of an intermediate ring 39 of 90° or less.

A plastic spring, which is characterized in that the spring legs 9, 10 extend over a circumferential angular range v of above 10° or more.

A plastic spring, which is characterized in that with respect to a circumferential extension of a spring leg 11, a spring leg longitudinal axis w, which is crossed at least twice by the spring leg 11 over the height h of the plastic spring 8, is at hand between the upper spring ring 10 and the lower spring ring 9.

A plastic spring, which is characterized in that both ends (40) of the spring leg 11 run into the lower and upper spring ring 9, 10 on the same circumferential side to the spring leg longitudinal axis w.

A plastic spring, which is characterized in that the plastic spring 8 is closed in the circumferential direction by means of wall regions 41, which connect the spring legs 11 to the spring rings 9, 10.

A plastic spring, which is characterized in that a wall region 41 has a radial thickness d″, which corresponds to less than half, up to one-fiftieth, of the radial thickness d of a spring leg 11.

A plastic spring, which is characterized in that two intermediate rings 39, 39', which follow one another in the direction r of the longitudinal axis y, run in an oppositely curved manner.

A plastic spring, which is characterized in that viewed from a central plane E' between two intermediate rings 39, 39', which runs perpendicular to the longitudinal axis y, the intermediate rings 39, 39' in each case run in a concavely or in each case in a convexly curved manner.

A plastic spring, which is characterized in that a width c of an intermediate ring 39, 39', which is at hand in the direction r of the longitudinal axis y, is larger by 10 percent or more than a width c', which is at hand in the same direction r, of the lower and/or upper spring ring 9, 10.

All of the disclosed features (alone, but also in combination with one another) are essential for the invention. The disclosure content of the corresponding/enclosed priority documents (copy of the prior application) is hereby also included in its entirety into the disclosure of the application, also for the purpose of adding features of these documents into claims of the present application. With their features, the subclaims, also without the features of a referenced claim, characterize independent inventive further developments of the prior art, in particular to file divisional applications on the basis of these claims. The invention specified in each claim can additionally have one or several of the features specified in the above description, in particular provided with reference numerals and/or specified in the list of reference numerals. The invention also relates to designs, in the case of which individual features, which are mentioned in the above description, are not realized, in particular insofar as they are discernibly expendable for the respective intended purpose or can be replaced by other technically identical means.

| LIST OF REFERENCE NUMERALS | |
|---|---|
| 1 | dispenser |
| 2 | mass |
| 3 | dispenser pump |
| 4 | pumping chamber |
| 5 | head piece |
| 6 | storage container |
| 7 | resetting device |
| 8 | plastic spring |
| 9 | lower spring ring |
| 10 | upper spring ring |
| 11 | spring leg |
| 12 | transition portion |
| 13 | follower plunger |
| 14 | bottom part |
| 15 | inlet valve |
| 16 | outlet valve |
| 17 | outer wall |
| 18 | pot base |
| 19 | opening |
| 20 | cylinder wall |
| 21 | pump plunger |
| 22 | passage opening |
| 23 | pump plunger part |
| 24 | hollow body |
| 25 | holding-down device |
| 26 | dispensing channel |
| 27 | actuating surface |
| 28 | collar |
| 29 | support shaping |
| 30 | support shaping |
| 31 | guide wall |
| 32 | reducing portion |
| 33 | triangle region |
| 34 | branch |
| 35 | rounded contour |
| 36 | rounded contour |
| 37 | second run-in radius |
| 38 | first run-in radius |
| 39 | intermediate ring |
| 39' | intermediate ring |
| 40 | end |
| 41 | wall region |
| 42 | dispenser opening |
| 43 | reducing portion |
| 44 | turning region |
| a | distance |

LIST OF REFERENCE NUMERALS

| | |
|---|---|
| a' | distance |
| b | width |
| b' | width |
| b" | width |
| c | width |
| c' | width |
| d | thickness |
| d' | thickness |
| d" | thickness |
| e | radius dimension |
| h | height |
| m | gradient |
| r | direction |
| r' | direction |
| s | gradient dimension |
| u | overlap dimension |
| v | circumferential angular range |
| w | spring leg longitudinal axis |
| x | axis |
| y | longitudinal axis |
| z | central longitudinal axis |
| A | run-in plane |
| E | plane |
| E' | central plane |
| VE | vertical plane |
| α | angle |

The invention claimed is:

1. A plastic spring (8) formed in one piece and comprising a lower spring ring (9) and an upper spring ring (10), which are arranged essentially coaxially to one another, wherein a plane (E), which is in each case spanned by the spring rings (9, 10), extends essentially perpendicular to a longitudinal axis (y) of the plastic spring (8), and wherein four intermediate rings (39, 39'), which extend essentially transversely to the longitudinal axis (y) of the plastic spring (8), are formed over the height (h) of the plastic spring (8), and wherein the spring rings (9, 10) and the intermediate rings (39, 39') are further connected to one another by means of spring legs (11), which extend between the intermediate rings (39, 39') as well as between the spring rings (9, 10) and the intermediate rings (39, 39'), wherein the spring legs each have rounded concave side contours, wherein, in addition, two of the intermediate rings (39, 39'), which follow one another in the direction (r) of the longitudinal axis (y), run in an oppositely curved manner, wherein the intermediate rings comprise several pairs of consecutive intermediate rings (39, 39') with oppositely curved progression over the extension of the longitudinal axis, wherein the intermediate rings (39, 39') run in a curved manner projecting into a vertical plane (VE), wherein a wave shape of the intermediate rings in each case results in the circumferential direction, comprising two diametrically opposite concave curvature regions and two convex curvature regions, which are offset by 90 degrees thereto in the circumferential direction and which are likewise located diametrically oppositely, so that each intermediate ring (39, 39') in the manner of a waved spring ring is formed circumferentially, wherein two first or two second intermediate rings (39 or 39'), of the four intermediate rings, are in each case designed identically, wherein the first intermediate rings (39) are aligned identically in the circumferential direction, while the second intermediate rings (39') are offset around the longitudinal axis by 90 degrees relative to the first intermediate ring (39), so that two pairs of consecutive first and second intermediate rings (39, 39') with oppositely curved progression are at hand, wherein a width (c) of the first intermediate ring (39) or of the second intermediate ring (39'), respectively, viewed in the direction (r) of the longitudinal axis (y), corresponds to 2 to 2.5-times the width (c') of the lower spring ring (9) or of the upper spring ring (10), respectively, wherein the widths (c) or (c'), respectively, are detected along the longitudinal axis (y) during a projection of the first intermediate rings (39) and of the second intermediate rings (39') as well as of the spring rings (9, 10) into a vertical plane (VE), in which the longitudinal axis (y) presents itself as line, wherein the widths further refer to a resulting outer edge of the first intermediate ring (39) or of the second intermediate ring (39'), respectively, or of the spring ring (9, 10), respectively and on an imaginary extension of an opposite outer edge of the first intermediate ring (39) of the second intermediate ring (39'), respectively, or of the spring ring (9, 10), respectively, which runs into the spring leg (11), wherein a length of one of the spring legs (11) that runs between one of the spring rings (9,10) and an adjacent one of the intermediate rings (39,39') is shorter than a length of one of the spring legs (11) that runs between adjacent intermediate rings (39,39').

2. The plastic spring according to claim 1, wherein viewed from a central plane (E') between the two first intermediate rings (39) or the two second intermediate rings (39'), respectively, which runs perpendicular to the longitudinal axis (y), the intermediate rings (39, 39') in each case run in a concavely or in each case in a convexly curved manner.

3. A plastic spring (8) comprising a lower spring ring (9) and an upper spring ring (10), which are arranged essentially coaxially to one another, wherein a plane (E), which is in each case spanned by the spring rings (9, 10), extends essentially perpendicular to a longitudinal axis (y) of the plastic spring (8), and wherein, in addition, the spring rings (9, 10) are connected to one another compressibly by means of spring legs (11), which extend over more than 90° in the circumferential direction, wherein the spring legs (11) run into the lower and/or upper spring ring (9, 10) in a transition portion (12), wherein each of the spring legs (11) further has a central longitudinal axis (z), which follows the curved progression of the respective spring leg (11), wherein a transition portion (12) of each spring leg (11), based on a run-in plane (A) perpendicular to the central longitudinal axis (z) in a run-in region into the lower or upper spring ring (9, 10), has a width (b), which is larger by 30 percent or more than in a cross sectional region approximately in the center of the longitudinal extension of the respective spring leg (11), wherein each of the spring legs (11) has a reducing portion (32) with respect to a cross section perpendicular to the central longitudinal axis (z), wherein the reducing portion (32) has a first radial thickness (d'), viewed with respect to the longitudinal axis (y), which corresponds to 0.3- to 0.95-times the thickness (d) of the non-reduced portion of the respective spring leg (11), and wherein with respect to a view radially from the outside, each reducing portion (32) comprising a gusset region which has an acute angle and is filling a triangle portion (33) between the respective spring leg (11) and the respective spring ring (9, 10), and a branch (34), which adjoins thereon and extends essentially in the longitudinal extension of the respective spring leg (11), wherein the branch (34) has a width (b'), which remains constant at least approximately over the longitudinal extension and which corresponds approximately to 0.1- to 0.5-times a total width (b") of the respective spring leg (11), including the reducing portion (32) in the gusset region, wherein, each one of the spring legs (11) moreover also has a first run-in radius (38), which is assigned to an obtuse angle between each spring leg (11) and the respective spring ring (9, 10), and which, with respect to a second run-in radius (37), is selected to be dimensionally larger, corresponds approximately to 1.5- to 5-times the second run-in radius (37).

4. The plastic spring according to claim 3, wherein only two spring legs (11) are provided and wherein the spring legs (11) are only connected to the spring rings (9, 10).

5. The plastic spring according to claim 3, wherein, viewed radially from the outside and based on a circumferential direction of the spring ring (9, 10), the run-in region has a first run-in radius (38) on one side, and located oppositely in the circumferential direction, a second run-in radius (37), wherein the second run-in radius (37) is smaller than the first run-in radius (38).

6. The plastic spring according to claim 5, wherein the second run-in radius (37), based on the cross section in the run-in plane (A), is formed at a portion (32) of the cross section that is reduced in diameter as compared to the triangle portion (33).

7. The plastic spring according to claim 6, wherein in the view Radially from the outside, the reducing portion (32) is formed to be essentially triangular, with rounded contours (35, 36) located oppositely in the circumferential direction.

8. The plastic spring according to claim 6, wherein in continuation of the longitudinal extension of the spring leg (11), the branch of the reducing portion (32) is of approximately constant width extension, wherein the width extension with respect to a largest width (b) in the triangle portion (33) corresponds to one-half or less.

9. The plastic spring according to claim 8, wherein the branch (34) extends only over a part of the longitudinal extension of the spring leg (11).

10. The plastic spring according to claim 8, wherein a second triangle region (33) and/or branch (34) is molded located oppositely, starting at the upper spring ring (10).

11. The plastic spring according to claim 10, wherein the branches (34) partially overlap in the longitudinal extension.

12. A plastic spring (8) comprising a lower spring ring (9) and an upper spring ring (10), which are arranged essentially coaxially to one another, wherein a plane (E), which is in each case spanned by the spring rings (9, 10), extends essentially perpendicular to a longitudinal axis (y) of the plastic spring (8), and wherein, in addition, the spring rings (9, 10) are connected to one another compressibly by means of at least four spring legs (11), which extend between the spring rings (9, 10), wherein two or more intermediate rings, which extend essentially perpendicular to the longitudinal axis (y) of the plastic spring (8), are further formed over the height (h) of the plastic spring (8), and are distributed over the circumference, wherein the at least four spring legs (11) extend in the direction of the longitudinal axis (y) over a circumferential angular range (v) of the intermediate rings (39) of 10-20°, wherein with respect to a view radially from the outside, each one of the spring legs (11) is wave-shaped, in each case with a half wave assigned to a free region between one of the spring rings and one of the intermediate rings, or between two of the intermediate rings (39), and wherein a connection to one of the intermediate rings (39) occurs in a region of a wave crest or of a wave trough, so that a half wave in one of the free regions transitions into an oppositely running half-wave in an adjacent one of the free regions, and wherein with respect to a circumferential extension of each of the spring legs (11), a spring leg longitudinal axis (w) results between the upper spring ring (10) and the lower spring ring (9), said spring leg longitudinal axis being crossed four times by the respective spring leg (11) over the height (h) of the plastic spring (8), wherein such a crossing occurs on half of an extension path of a spring leg portion between two rings, wherein every spring leg portion between two rings crosses the spring leg longitudinal axis (w) of the respective spring leg;

wherein every wave crest and every wave trough of each spring leg has an equal extension from the respective spring leg longitudinal axis (w) in a direction perpendicular to the spring leg longitudinal axis (w);

and wherein the ends of each spring leg run into the lower and upper spring rings on a same circumferential side of the spring leg longitudinal axis (w).

13. The plastic spring according to claim 12, wherein the plastic spring (8) is closed in the circumferential direction by means of wall regions (41), which connect the spring legs (11) to the spring rings (9, 10).

14. The plastic spring according to claim 13, wherein the wall region (41) has a radial thickness (d"), which corresponds to less than half, up to one-fiftieth, of the radial thickness (d) of a spring leg (11).

* * * * *